United States Patent
Boris

(10) Patent No.: US 11,212,892 B1
(45) Date of Patent: Dec. 28, 2021

(54) VARIABLE FREQUENCY PWM LED CONTROL CIRCUIT AND METHOD

(71) Applicant: STREAMLIGHT, INC., Eagleville, PA (US)

(72) Inventor: Thomas D. Boris, Collegeville, PA (US)

(73) Assignee: Streamlight, Inc., Eagleville, PA (US)

(*) Notice: Subject to any disclaimer, the term of this patent is extended or adjusted under 35 U.S.C. 154(b) by 22 days.

(21) Appl. No.: 16/904,670

(22) Filed: Jun. 18, 2020

(51) Int. Cl.
| | |
|---|---|
| H05B 45/325 | (2020.01) |
| F21L 4/08 | (2006.01) |
| H02J 7/00 | (2006.01) |
| F21Y 115/10 | (2016.01) |

(52) U.S. Cl.
CPC .............. H05B 45/325 (2020.01); F21L 4/08 (2013.01); H02J 7/007 (2013.01); F21Y 2115/10 (2016.08)

(58) Field of Classification Search
CPC ...... H05B 45/325; H05B 45/32; H05B 45/30; H05B 45/00; F21L 4/08; F21L 4/00; H02J 7/007; H02J 7/0071; H02J 7/00711; F21Y 2115/10; F21V 23/00; F21V 23/003; F21V 23/004; F21V 23/006; F21V 23/04; F21V 23/0407; F21V 23/0414
See application file for complete search history.

(56) References Cited

U.S. PATENT DOCUMENTS

| | | | | |
|---|---|---|---|---|
| 6,095,661 A | * | 8/2000 | Lebens | H04B 10/564 |
| | | | | 362/184 |
| 7,466,082 B1 | | 12/2008 | Snyder et al. | |
| 7,740,371 B1 | * | 6/2010 | Lebens | H04N 5/2252 |
| | | | | 362/205 |
| 8,727,561 B2 | | 5/2014 | Sharrah et al. | |
| 2007/0183152 A1 | * | 8/2007 | Hauck | G09F 13/30 |
| | | | | 362/249.07 |
| 2010/0176734 A1 | * | 7/2010 | Haubmann | H05B 45/10 |
| | | | | 315/185 R |

OTHER PUBLICATIONS

Streamlight, Inc., "Stylus Pro® USB Lithium Ion Rechargeable Flashlight", Product Fact Sheet, Document #183, Issued: Dec. 19, 2013, Revised: Dec. 12, 2019, Rev: 4, 1 page.

(Continued)

*Primary Examiner* — Bao Q Truong
(74) *Attorney, Agent, or Firm* — Clement A. Berard, Esq.; Dann, Dorfman, Herrell & Skillman, PC

(57) ABSTRACT

A control circuit for a light source comprises: a light source, a drive circuit applying a pulse width modulated (PWM) drive signal to the light source; and a pulse width modulator generating the PWM drive signal having a PWM ON time ratio responsive to a control signal and a PWM drive frequency that varies over a range of frequencies repeatedly and substantially continuously. A method for controlling a light source comprises: applying a pulse width modulated (PWM) drive signal to the light source; generating the PWM drive signal having a PWM ON time ratio responsive to a control signal and having a PWM drive frequency that is varied over the range of frequencies repeatedly and substantially continuously. The PWM drive signal causes the light source to produce light at the varying frequency, whereby light at a frequency exhibited by a moving object does not continuously illuminate a moving object.

35 Claims, 6 Drawing Sheets

(56) References Cited

OTHER PUBLICATIONS

Streamlight, Inc., "Stylus Pro® USB Rechargeable Penlight", Data Sheet, Dated Jan. 2020, 1 page.
Streamlight, Inc., "Stylus Pro® USB", Operating Instructions, Dated Oct. 2018, 2 pages.
Lianyi, "LY3086 Standalone Linear Li-Lon Battery Charger with Thermal Regulation", undated, www.szlianyi.cn, 7 pages.
At Win Technology Co., Ltd., "AT60F01", Data Sheet, undated, 51 pages.

* cited by examiner

VARIABLE FREQUENCY PWM LED CONTROL CIRCUIT AND METHOD

The present invention relates to a control circuit and method and, in particular, to a control circuit and method providing variable frequency PWM control, as for a source of light.

Portable lights are utilized in many industrial, commercial and other applications in environments where moving objects are present. Examples include inter alia automotive work where moving fans, belts and pulleys are present, or in heating and air conditioning where moving fans are present, and in other industrial and manufacturing equipment. Such moving objects are a danger and safety hazard to body parts of workers and users, and also to work lights, tools, equipment, replacement parts and the like, if the moving object were to come into contact therewith, likely causing personal injury and/or property damage. Holding a timing light come when it came into contact with a vehicle cooling fan when adjusting the distributor angle for proper ignition timing is an unforgettable experience, happily mostly a memory now.

Most modern portable lights include a light emitting diode (LED) light source that is powered by electronic circuitry that converts (or conditions) a voltage and current available from a power source to a voltage and current that is suitable for operating the LED light source. The power source may be part of the portable light, e.g., an internal battery or other stored power source, or may be connected to the power source by a cable of any suitable length. Commonly such power conversion or conditioning employs switching circuitry where power from a DC source is changed into a series of pulses that are more easily and efficiently changed into power suitable for operating the LED.

Such power converters/conditioners may supply DC power to the LED or may supply pulsed or AC power to the LED, i.e at a frequency that is above that to which the human eye responds, e.g., above 20-30 Hz, so that the light output appears to be continuous. This is the same principle that is used for televisions that scan and refresh an image at 30 Hz or 60 Hz so that it appears to be continuous or to power an incandescent lamp at 60 Hz so that it appears to provide a constant level of light.

However, when an LED is powered by pulsed or AC power, where the frequency of the pulsing of a light source is near to or at the frequency at which features of a moving object are under illumination by the pulsed light, the individual features will appear to be stationary or slowly moving. This is sometimes referred to as a strobing effect.

While this strobing phenomenon may be useful in some settings, e.g., for an automotive timing light or in strobe photography, it can present a real danger to a user of the light who wrongly perceives the object to be stationary when in fact it is moving, perhaps rapidly. Extending a hand into such moving object can cause injury to fingers of the hand, or possibly severing fingers from a hand.

Where the portable light is powered by an external power source to which the light connects by wires or a cable, if the wires or cable were to come into contact with the moving object (that appears stationary) causing damage to the wires or cable resulting in possible electrical shock or in a short circuit that could produce heat sufficient to cause a burn or that could ignite a flammable substance producing a fire or explosion.

Applicant believes there is a need for a control circuit and method for a portable light that does not produce a strobing effect even when the light source thereof may by energized by pulsed or AC power.

Accordingly, a control circuit for a light may comprise; a light source; a drive circuit for applying a pulse width modulated (PWM) drive signal to the light source; and a pulse width modulator generating the PWM drive signal having a PWM ON time ratio responsive to a control signal and having a PWM drive frequency that varies over a range of frequencies repeatedly and substantially continuously. The varying frequency of the PWM drive signal causes the light source to produce light at the varying frequency, whereby light at a frequency exhibited by a moving object does not continuously illuminate an object moving at that frequency.

In another aspect, a control circuit for a light source may comprise: a light emitting diode (LED) light source; a drive circuit for applying a pulse width modulated (PWM) drive signal to the LED; and a processor configured to generate the PWM drive signal and to vary the frequency thereof. The processor may include a pulse width modulator generating the PWM drive signal having a PWM ON time ratio responsive to a control signal and having a PWM drive frequency that varies over a range of frequencies repeatedly and substantially continuously. The varying frequency of the PWM drive signal causes the LED to produce light at the varying frequency, whereby light at a frequency exhibited by a moving object does not continuously illuminate an object moving at that frequency.

In yet another aspect, a control circuit for a light source may comprise: a light body; a light emitting diode (LED) light source supported by the light body; a drive circuit supported by the light body and applying a pulse width modulated (PWM) drive signal to the LED; a processor supported by the light body to generate the PWM drive signal and to vary the frequency thereof. The processor may include a pulse width modulator generating the PWM drive signal having a PWM ON time ratio responsive to a control signal and having a PWM drive frequency that varies over a range of frequencies repeatedly and substantially continuously causing the LED to produce light at the varying frequency. The control signal to which PWM ON time ratio of the PWM drive signal is responsive is generated by the opening of the electrical switch, by the closing of the electrical switch, or by the opening and the closing of the electrical switch, whereby light at a frequency exhibited by a moving object does not continuously illuminate an object moving at that frequency.

In summarizing the arrangements described and/or claimed herein, a selection of concepts and/or elements and/or steps that are described in the detailed description herein may be made or simplified. Any summary is not intended to identify key features, elements and/or steps, or essential features, elements and/or steps, relating to the claimed subject matter, and so are not intended to be limiting and should not be construed to be limiting of or defining of the scope and breadth of the claimed subject matter.

BRIEF DESCRIPTION OF THE DRAWING

The detailed description of the preferred embodiment(s) will be more easily and better understood when read in conjunction with the FIGURES of the Drawing which include.

Figure 1A:
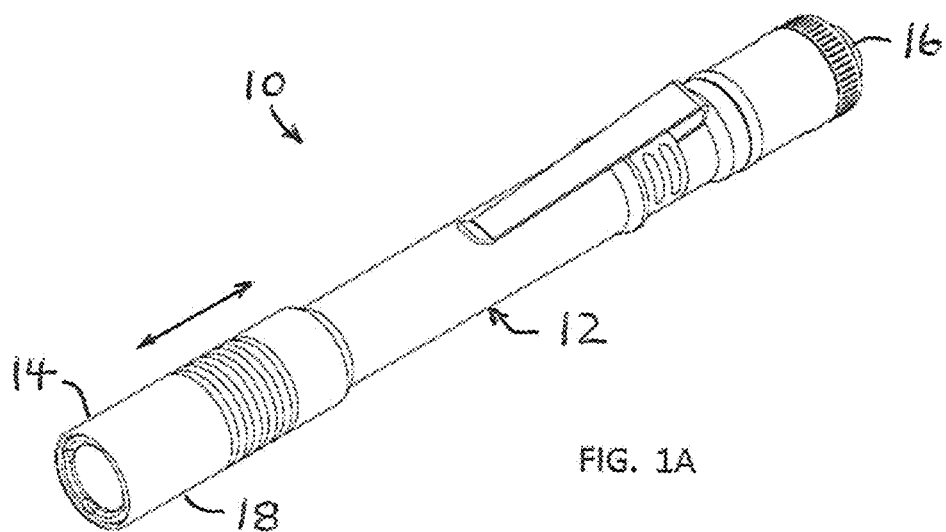
FIGS. 1A and 1B are perspective views of an example embodiment of a portable light which may utilize an example electronic control circuit as described herein.

In the Drawing, where an element or feature is shown in more than one drawing figure, the same alphanumeric designation may be used to designate such element or feature in each figure, and where a closely related or modified element is shown in a figure, the same alphanumerical designation may be primed or designated "a" or "b" or the like to designate the modified element or feature. Similar elements or features may be designated by like alphanumeric designations in different figures of the Drawing and with similar nomenclature in the specification. As is common, the various features of the drawing are not to scale, the dimensions of the various features may be arbitrarily expanded or reduced for clarity, and any value stated in any Figure is by way of example only.

DESCRIPTION OF THE PREFERRED EMBODIMENT(S)

Figure 1B:
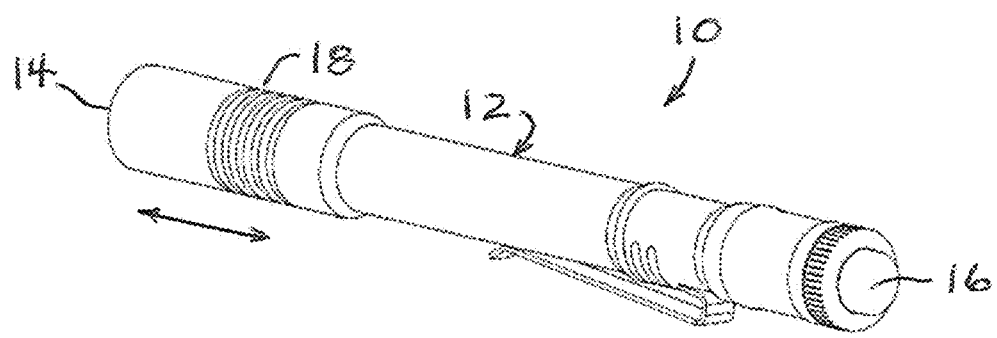
Figure 1C:
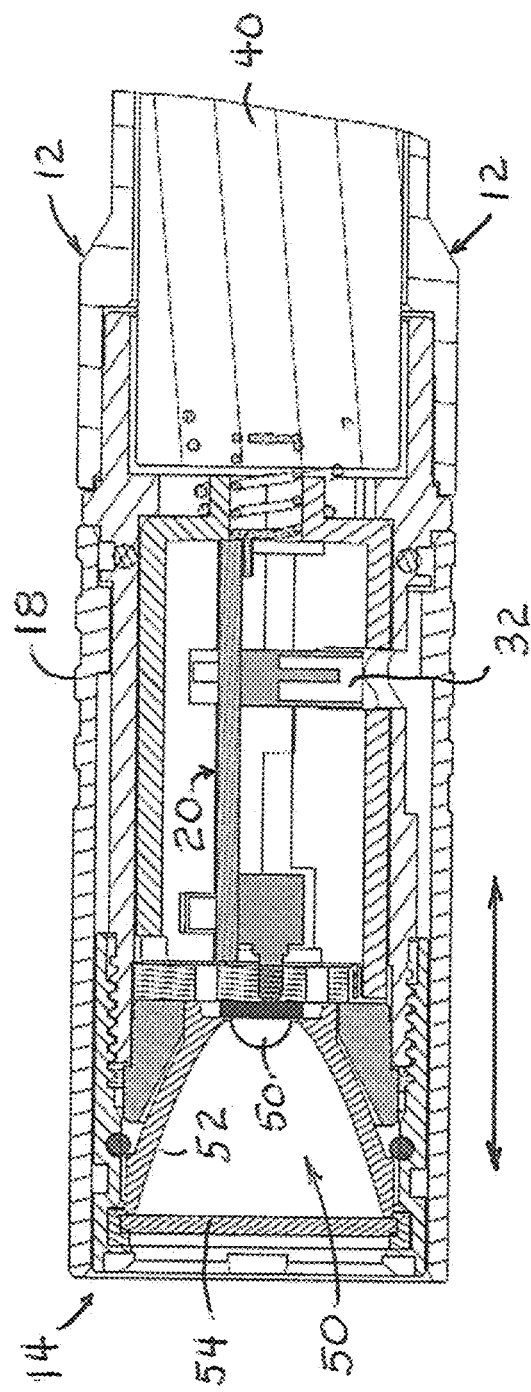
FIG. 1C is a cross-sectional view of a forward end thereof.

FIGS. 1A and 1B are perspective views of an example embodiment of a portable light 10 which may utilize an example control circuit 20 as described herein, and FIG. 1C is a cross-sectional view of a forward end 14 thereof. An example light 10 may include a light body having a light source 50 providing light, having a source of electrical power 40 and having a control switch 16 for causing the selective energization of the light source 50. In the illustrated example, light 10 includes light body 12 having a light source 50 providing light at a forward end 14 thereof, having a source of electrical power 40 internal to light body 12 and having a control switch 16 at the rearward end thereof.

The present example electronic control circuit may be employed with lights of virtually any configuration: lights having one or more light sources whether fixed or movable and located at any suitable location or locations thereon, having an internal or an external source of power or both, and/or having one or more switches located at any suitable location or locations thereon. The light 10 may have a clip, a handle, a hanger, a clamp, a lanyard or any other suitable accessory, whether fixed or removable.

When example light 10 includes a rechargeable source of electrical power 40, e.g., a rechargeable battery 40, it is convenient to provide for recharging such power source without having to remove it from light 10. To that end, light body 12 may include a slidable cover or collar 18, e.g., at the forward end 14 thereof, that slides in a first direction, e.g., forwardly, to expose a connector 32 for receiving charging power and in a second and opposite direction, e.g., rearwardly, to cover the connector 32, as indicated by a double ended arrow.

The electronic circuitry 20 of light 10 may be disposed on a circuit board 20 to which the charging connector 32 for battery 40 connects. Connector 32 may be any suitable connector, however, a USB connector, mini-USB connector or micro-USB connector is preferred. One or more seals, e.g., O-rings, may be provided for slidable collar 18 to reduce entry of moisture and/or debris under collar 18. Light source 50 may be disposed adjacent an optical element 52, e.g., a reflector or solid TIR element, for forming the light exiting light 10 into a desired beam, and may be covered by a lens 54.

Figure 2:
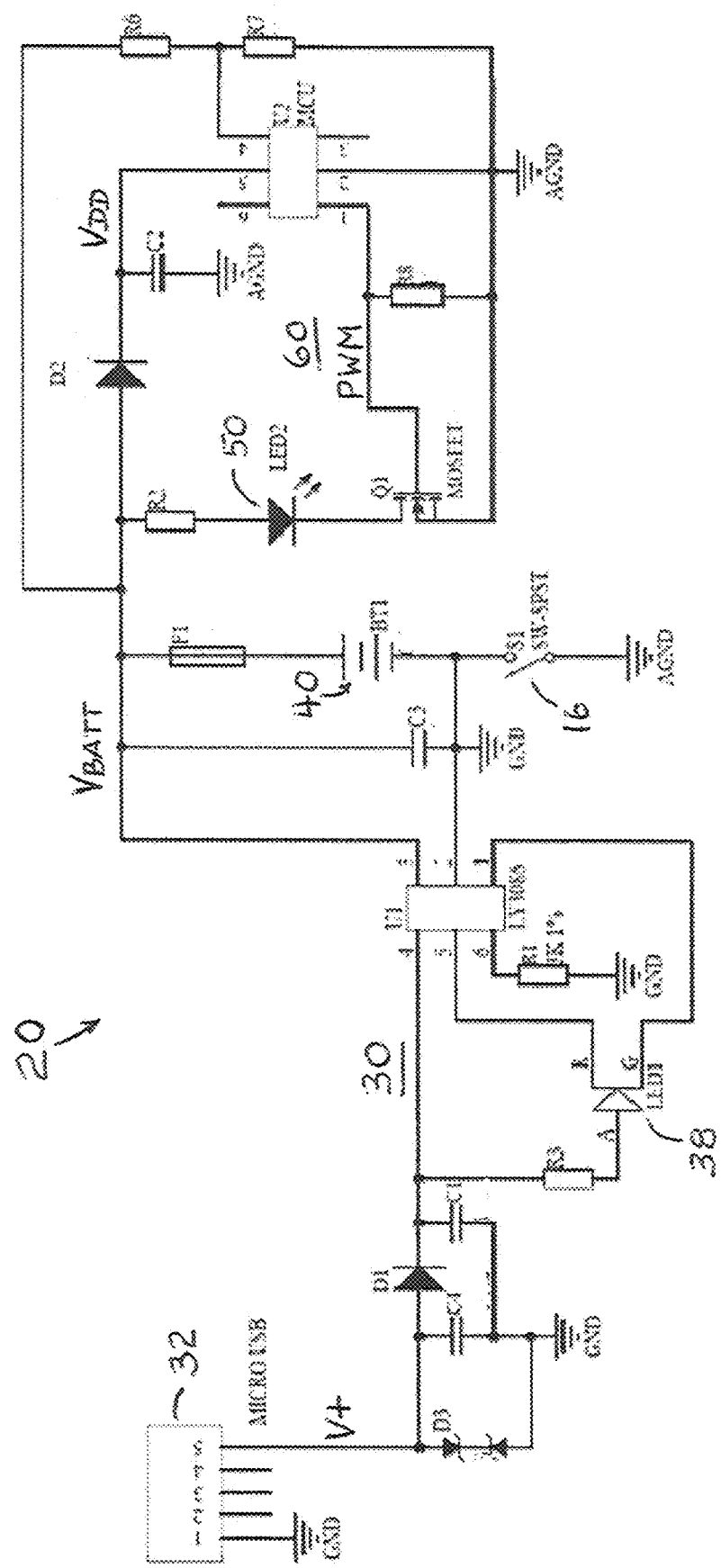
FIG. 2 is a schematic diagram of an example embodiment of an electronic control circuit according to this disclosure.

FIG. 2 is a schematic diagram of an example embodiment of an electronic control circuit 20 for a portable light 10 according to this disclosure. Power source 40 in the illustrated example control circuit 20 is a rechargeable battery, e.g., a lithium-ion rechargeable battery 40, having a voltage Vbatt, e.g., nominally 3.7 VDC. Power from an external power source to charge and recharge battery 40 via charging circuit 30 is received, e.g., at a connector 32 on light 10, such as a USB, mini-USB or micro-USB connector 32. Connector 32 typically connects to an adapter receiving AC power or to a computer, e.g., a laptop computer, or a fast recharge power pack, or other suitable source. Suitable external power sources provide voltage V+ of about +5 VDC on the standard V+ and ground pins of the USB connector.

Charging circuit 30 includes an integrated circuit U1 that receives the input voltage V+ from connector 32 and controllably passes charging current via one output thereof to battery 40. IC U1 typically causes the charging current to decrease as the battery voltage Vbatt approaches a voltage indicative of full battery charge, at which the charging of battery 40 is substantially reduced or terminated. Different techniques for charging and ending the charging of rechargeable batteries are known in the art.

For one example IC U1 has an external resistor R1 having a resistance value that is used to set the maximum battery charging current and has internal circuitry that sets the end-of-charge voltage Vbatt, e.g., about 4.2 VDC for a Li-Ion cell. Example IC U1 has one or more outputs that are coupled to one or more indicators, e.g., of LED 1, that represent an operating state or states of the charging process. In the present example, LED 1 includes in a single package a red LED R that may be utilized to indicate, e.g., that the battery needs charging and/or is being charged, and a green LED that may be utilized to indicate, e.g., that the battery 40 is substantially fully charged.

Alternatively, it is noted that light 10 may employ a single-use battery or a rechargeable battery that is removable from light 10 for being recharged, in which case charging circuit 30 would not be necessary. Further, light 10 could be powered from an external source via wires or a cable in which case charging circuit 30 and battery 40 would not be necessary. Optionally, diode D1 may be provided to protect light 10 against being connected to an external power source of the wrong polarity and/or against discharge of battery 40 through connector 32. Optionally, a surge protector D3 may be provided at input connector 32. Also optionally, a fuse F1 may be provided in series with battery 40 to prevent damage being caused by charging and/or discharging current that exceeds the rating of fuse F1.

In the illustrated example embodiment, LED control circuit 60 becomes energized when coupled to battery 40 when control switch S1, 16 is closed, thereby to connect battery ground GND to control circuit 60 ground AGND. It is noted that many different configurations of control circuit 60 are contemplated and with regard to power and signaling may be classified into two basic types—those that receive power continuously wherein switch S1, 16 only performs a signaling function, and those that are powered only when operating wherein switch S1, 16 performs both power switching and signaling functions.

In the first type, the negative terminal of battery 40 would be directly connected to AGND while resistor R7 would connect to AGND through switch S1, 16 for providing signaling to IC U2, e.g., ON/OFF signaling and/or mode selection signaling, e.g., for providing signal representing a second tap on switch S1, 16 and/or a signal representing turning LED 50 to an OFF state. In the second type, the negative battery terminal GND connects to AGND and resistor R7 through switch S1, 16 for applying and removing battery power to control circuitry 60 and for signaling with IC U2, e.g., for providing signal representing a second tap on switch S1, 16 and a power disconnect for turning LED 50 to an OFF state. The illustrated example embodiment thereof is of the second type.

Integrated circuit controller U2 receives an operating voltage VDD from battery voltage Vbatt via diode D2 and filtering capacitor C2. Capacitor C2 also serves to provide supply voltage to maintain IC U2 in an operating condition during short interruptions in power from battery 40 when switch S1 is momentarily actuated to signal a change in operating mode. A portion of battery voltage Vbatt is applied to an input of IC U1 via resistive voltage divider R6-R7 when switch S1, 16 is closed, thereby to signal to IC U2 by the presence and absence of voltage closures and openings of switch S1, 16 for controlling the ON and OFF states of LED 50 (LED 2) and other operating conditions of LED 50.

The example switch S1, 16 illustrated may be a single-pole single-throw (SPST) switch that changes its contact condition in an alternating or toggling manner from open to closed and then from closed to open with each successive actuation wherein actuator 16 thereof is fully pressed, e.g., it "clicks" and maintains the changed contact condition when the actuator 16 thereof is fully pressed and released. Optionally, and preferably, switch S1, 16 also has a momentary or temporary actuation condition wherein its contact condition changes from being open to being momentarily closed when actuator 16 is partially pressed. Thus if the contacts of switch S1, 16 are open, a partial pressing or "tapping" of actuator 16 will cause the contacts to close and remain closed momentarily, i.e. until actuator 16 is released. If the contacts of switch S1, 16 are closed, a partial pressing or "tapping" of actuator 16 will not change the contact closed condition.

Thus, in the example embodiment illustrated, when switch S1, 16 is actuated twice while the contacts thereof are open, then the first actuation, e.g., a click or tap, causes battery power to be applied to charge capacitor C2 and to power IC U2 to turn LED 50 ON. A second actuation following an initial tap (momentary) operation, e.g., whether a click or a tap, causes a momentary interruption and re-application of battery power signaling via R6-R7 a change of operating mode, e.g., a change in the level of power to be applied to LED 50 to change the brightness of the light therefrom. If light 10 is ON after one or two taps, then release of switch S1, 16 removes power from IC U2 and LED 50 thereby to cause light 10 to turn OFF. If light 10 is ON after a click of switch S1, 16, then another click of switch S1, 16 removes power from IC U2 and LED 50 and light 10 is OFF.

IC U1 controls FET Q1 to preferably be either ON, i.e. conducting, or OFF, i.e. not conducting. When FET Q1 is ON current from Vbatt flows through LED 50 thereby energizing it to produce light, typically a "white" light for illumination. The value of current flowing through LED 50 is determined by Vbatt (less the operating voltages of LED 50 and FET Q1) and the value of resistor R2. The brightness of the light produced by LED 50 is proportional to the current flowing through LED 50 and the value of that current can be varied by controlling the relative ON and OFF times of FET Q1.

If Q1 were to be ON 100% of the time then LED would produce light at a relative brightness of 100% and if Q1 were ON for a lower percentage of the time then the brightness of LED 50 would be likewise less, e.g., for Q1 being ON 60% of the time, the relative brightness would be about 60% and for Q1 being ON 40% of the time the relative brightness would be about 40%. This is accomplished by IC U2 controlling or modulating the width in time of the series of control pulses applied to FET Q1 so that operation of LED 50 is likewise modulated by that pulse width, i.e. is pulse width modulated (PWM). Because the PWM frequency is above the sensitivity range of the human eye, the light output from LED 50 appears as being substantially constant with its brightness being variable responsive to the PWM control signal from IC U2.

Controller IC U2 preferably operates to turn FET Q1 and LED 50 ON and OFF at a frequency that is above frequencies that would be apparent to the human eye, and preferably significantly above that frequency. One example is to operate at or above 100 Hz. It is noted that many LEDs have an operating point at a relatively high current whereat the efficiency or light output (brightness) to electrical power input is at or near a maximum value. Operating the LED 50 at this operating point when it is ON, e.g., for the portion of each cycle of the PWM drive signal at which LED 50 is ON, provides a higher efficiency that would operation at a DC current of the same average value.

Preferably, control circuit 60 operates over a predetermined range of frequencies with the frequency at which LED 50 is turned ON and OFF not being fixed, but being cyclically increased through the predetermined range of frequencies over a predetermined first period of time and then decreased through the predetermined range of frequencies over a second predetermined period of time. The first and second predetermined periods of time may be the same or may be different.

Examples of PWM frequency ranges may include 100 to 1000 Hz, or 250 to 850 Hz, or 250 to 400 Hz, or 252 to 320 Hz. One example of the predetermined time period for increasing the PWM frequency and for decreasing the PWM frequency is one second, giving a cycle time of two seconds which is repeated for as long as light 10 is turned ON. Other predetermined time periods can be utilized, e.g., time periods being either longer or shorter than the foregoing example, and the time of the ramping up (increasing) of the PWM frequency need not be the same as the time for ramping down (decreasing) that frequency. The ramping up and down of PWM frequency may be substantially linear or non-linear, or may be sinusoidal or any other suitable form.

Further, the ramping up and down of the PWM frequency may be generated using analog circuitry, e.g., charging and discharging a capacitor, or digitally, e.g., by incrementing and decrementing the PWM frequency in a sequence of controlled increments and controlled decrements. In one example embodiment wherein the changing of PWM frequency is digitally generated, the PWM frequency is incremented from 250 Hz to 400 Hz by 50 steps of +3 Hz each over a predetermined time of one second and then decremented from 400 Hz to 250 Hz by 50 steps of −3 Hz each over another predetermined time of one second, with that two second cycle being repeated for as long as light 10 (and LED 50 thereof) is ON. In another example embodiment wherein the range of PWM drive frequencies is about 252 to 320 Hz, incrementing and decrementing the PWM frequency over one second increasing and one second decreasing with each having 50 steps of about 1.36 Hz each.

The cycling of PWM frequency over a range of frequencies is sufficient to avoid a strobing effect that would make a moving object that is illuminated by the light produced by LED 50 appear stationary so that the object would appear to be moving and not stopped. While the examples described generally have uniform repetitive cycles and times, such is not required to obtain the benefits of the described arrangement. For example, the end points of the range of frequency may change over time, either in a predetermined sequence or in a random sequence, as may the size of the frequency steps, the number of frequency steps, and/or the duration of each step. So long as the PWM drive frequency is changing over time substantially continuously, whether regularly or irregularly, the strobing effect when illuminating a moving object can be avoided.

In this example, IC U2 of the example circuit 60 provides the pulse width modulator for generating the PWM drive signal and varying the frequency thereof, wherein the PWM drive signal has a PWM ON time ratio responsive to a control signal and has a PWM drive frequency that is varied over a range of frequencies repeatedly and substantially continuously. The PWM ON time ratio is substantially independent of the varying of the PWM frequency.

In addition, and independently of the cycling up and down of the PWM frequency, the relative brightness of LED 50 can be changed by changing the PWM ratio, e.g., the ratio of its ON time to OFF time, or the ratio of its ON time to total ON+OFF time in fixed frequency operation as in this example, so as to control the relative brightness of the light produced thereby. The ratio of the ON time of Q1 and LED 50 to the total of the ON and OFF time thereof in each cycle of the pulsed or AC drive remains substantially the same irrespective of the increasing and decreasing of the PWM signal frequency. In other words, the ratio of IN time to OFF time remains substantially the same even as the period of each cycle of the PWM signal decreases and increases as the frequency of the PWM signal increases and decreases, respectively.

Changing of brightness may be responsive to opening and/or closing of switch S1, 16 one or more times or for a period of time, either when light 10 is turned ON thereby or during operation, depending upon the capability and programming of the processor that is part of the controller IC U2 that is provided. In one example that employs a relatively basic processor/controller U2, a single actuation (single click) of switch S1, 16 will turn light 10 ON (e.g., turn LED 50 ON) at a relatively high brightness and a quick double actuation (double click) of switch S1, 16 within one second will turn light 10 ON (e.g., turn LED 50 ON) at a relatively lower brightness. The next actuation of switch S1, 16 thereafter will turn light 10 OFF. Example switch S1 illustrated may be a single-pole single-throw (SPST) switch.

Of course other combinations of the number of actuations and/or the length in time of actuations may be employed to select these and other operating modes for light 10. Examples thereof may include, e.g., changing brightness by dimming and undimming LED 50, entering and leaving a flashing light mode or a strobing mode, and the like.

IC U1 may be, e.g., a type LY3086 stand-alone constant-current/constant voltage linear charger for single cell lithium-ion batteries which provides thermal regulation and is commercially available from Shenzhen Lianyi Microelectronics Ltd. of Shenzhen, China. IC U2 may be, e.g., a type AT60F01 MCU microprocessor or microcontroller which is commercially available from AT Win Technology Co. Ltd. of Taipei, Taiwan, ROC.

Figure 3:
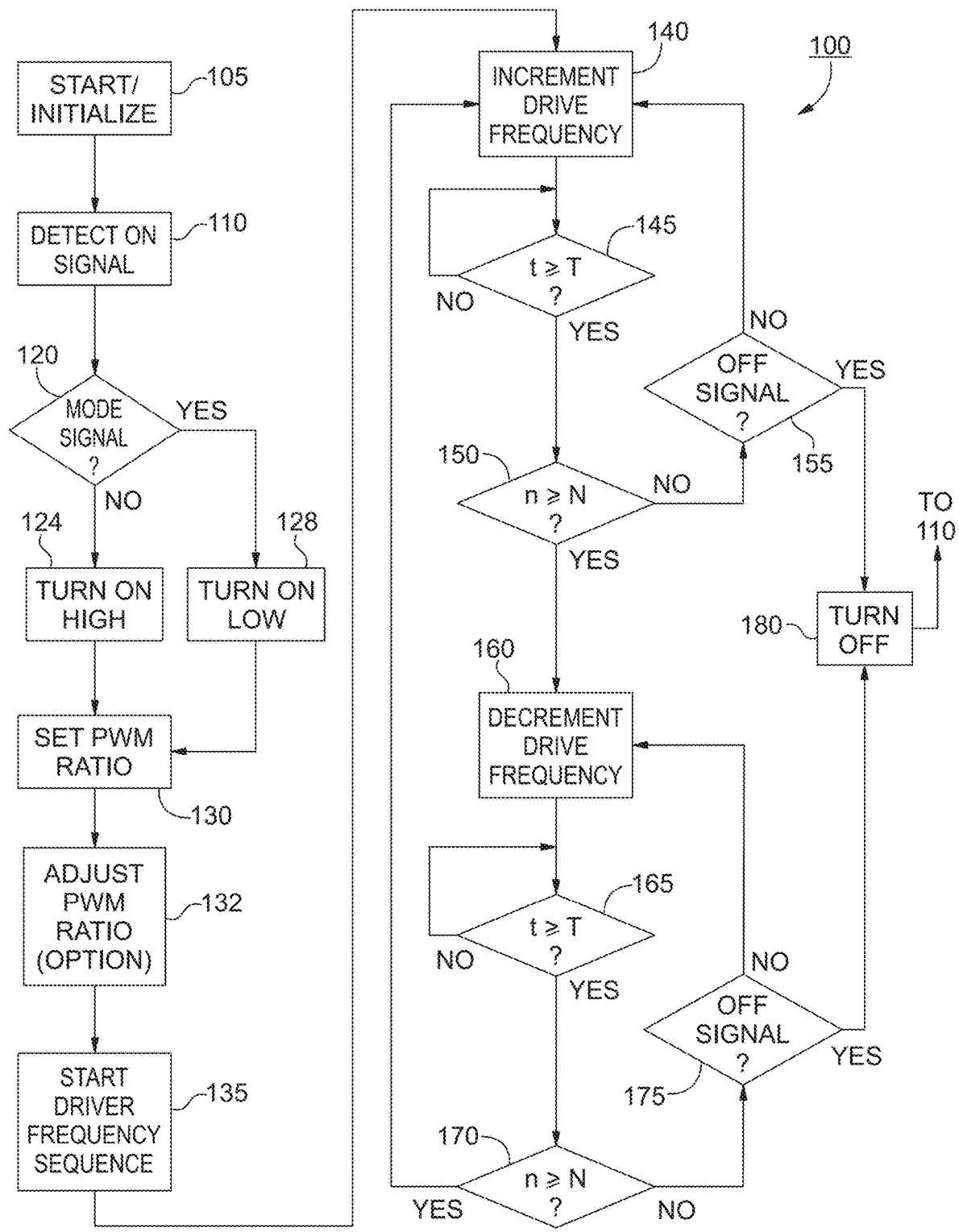
FIG. 3 is a schematic flow diagram illustrating an example flow process of the operation of the example control circuit.

FIG. 3 is a schematic flow diagram illustrating an example process 100 of the operation of the example control circuit 100. Process 100 starts with initializing 105 the control circuit whether after electrical power is applied or by applying the power. The turn ON signal, e.g., generated by actuation of a control switch, is detected 110 whether the turn ON signal is generated, e.g., by actuating a switch, independently of power being turned ON, or by applying power by actuating switch S1, 16 to connect circuit 60 to the source of power, e.g., battery 40, as in the illustrated embodiment. A mode selection signal may also be generated, e.g., by actuating a separate mode switch or by actuating the control switch S1, 16 again briefly to momentarily remove power as in the example illustrated.

If/when a mode selection signal is not detected 120N, the light source, e.g., LED 50, is turned ON, e.g., energized, in a higher power/higher brightness mode 124; however, if/when a mode selection signal is detected 120Y, the light source, e.g., LED 50, is turned ON, e.g., energized, in a lower power/lower brightness mode 128. A PWM ratio is established 130 at a predetermined value corresponding to the higher power/higher brightness mode 124 or to the lower power/lower brightness mode 128 in accordance with the detected 120 mode signal.

In one example, a PWM ratio for higher power/higher brightness mode 128 may be, e.g., in a range of about 95 to 40 percent, e.g., initially, and thereafter typically about 40 percent, and a PWM ratio for lower power/lower brightness mode 128 may be, e.g., in a range of about 20 to 30 percent, typically about 25%. While the selected PWM ratio for each selected mode may be a fixed ratio, it may optionally be varied 132 responsive to battery voltage Vbatt so as to maintain a more even selected brightness of light produced by LED 50 as battery 40 discharges.

Starting 135 the driver frequency sequence starts the part of process 100 that causes the frequency of the PWM signal that drives LED 50 to ramp up (increase) and ramp down (decrease) repeatedly in a periodic manner as described above. The PWM drive frequency is incremented 140 by a predetermined increment to make an initial change to increase the PWM drive frequency after which the elapsed time t is tested 145 to determine whether it is greater or equal to a predetermined time T. If/when time t is less than time T 145N, process 100 continues without changing the PWM drive frequency until time t becomes equal to or greater than time T 145Y, process 100 continues by testing 150 whether the number n of increments applied to the PWM drive frequency without changing the PWM drive frequency.

If/when the number n is less than the predetermined number N of increments 150N to the PWM drive frequency, the presence or absence of a switch actuation is tested 155. Since light 10 is ON at this time, a switch actuation 155 is a signal to turn light 10 OFF, e.g., an OFF signal. If an OFF signal is detected 155Y, process 100 turns 180 light 10 OFF and process 100 returns to step 110 to await the next turn ON signal. If an OFF signal is not detected 155N, process 100 returns to step 140 to again increment the PWM drive frequency by one increment, where after steps 140, 145, 150 are repeated until test 150 determines that the number of increments n is equal to or greater than the predetermined number N of increments 150Y and process 100 proceeds to step 160.

At step 160 the process of incrementing the PWM drive frequency ends and the PWM drive frequency is decremented 160 by an increment. The PWM drive frequency is decremented 160 by a predetermined increment to make an initial change to decrease the PWM drive frequency after which the elapsed time t is tested 165 to determine whether it is greater or equal to a predetermined time T. If/when time t is less than time T 165N, process 100 continues without changing the PWM drive frequency until time t becomes equal to or greater than time T 165Y, process 100 continues by testing 170 whether the number n of decrements applied to the PWM drive frequency without changing the PWM drive frequency.

If/when the number n is less than the predetermined number N of decrements 170N to the PWM drive frequency, the presence or absence of a switch actuation is tested 175. Since light 10 is ON at this time, a switch actuation 175 is a signal to turn light 10 OFF, e.g., an OFF signal. If an OFF signal is detected 175Y, process 100 turns 180 light 10 OFF and process 100 returns to step 110 to await the next turn ON signal. If an OFF signal is not detected 175N, process 100 returns to step 160 to again increment the PWM drive frequency by one increment, where after steps 160, 165, 170 are repeated until test 170 determines that the number of increments n is equal to or greater than the predetermined number N of increments 170Y and process 100 proceeds to step 140 to again begin incrementing 140 the PWM drive frequency.

In like manner, steps 140 through 175 repeat as described to increment, e.g., ramp up, the PWM drive frequency until the predetermined number N increments each of predetermined time T are performed and then to decrement, e.g., ramp down, the PWM drive frequency until the predetermined number N decrements each of predetermined time T are performed. The foregoing cycle of increasing and decreasing the PWM drive frequency continues repetitively and periodically until a turn OFF signal 180 is detected 180.

In one example embodiment, the predetermined number N of increments and of decrements is 50, and each increment and each decrement changes the PWM drive frequency by about 3 Hz and that changed PWM drive frequency is maintained for predetermined time T of 20 milliseconds. Accordingly, in that example, the PWM drive frequency increases by 150 Hz over a period of one second and then decreases by 150 Hz over one second, and this cycle of frequency increasing and decreasing repeats until another command signal is received. An example range of PWM drive frequencies therein is about 250 to 400 Hz.

In another example embodiment, the predetermined number N of increments and of decrements is 50, and each increment and each decrement changes the PWM drive frequency by about 1.36 Hz and that changed PWM drive frequency is maintained for predetermined time T of 20 milliseconds. Accordingly, in that example, the PWM drive frequency increases by about 68 Hz over a period of one second and then decreases by about 68 Hz over one second, and this cycle of frequency increasing and decreasing repeats until another command signal is received. An example range of PWM drive frequencies therein is about 252 to 320 Hz.

The turn OFF signal, e.g., generated by actuation of a control switch, is detected 155, 175 whether the turn OFF signal is generated, e.g., by actuating a switch, independently of power being turned OFF, or by actuating switch S1, 16 to disconnect circuit 60 from the source of power, e.g., battery 40, as in the illustrated embodiment.

Figure 4A:
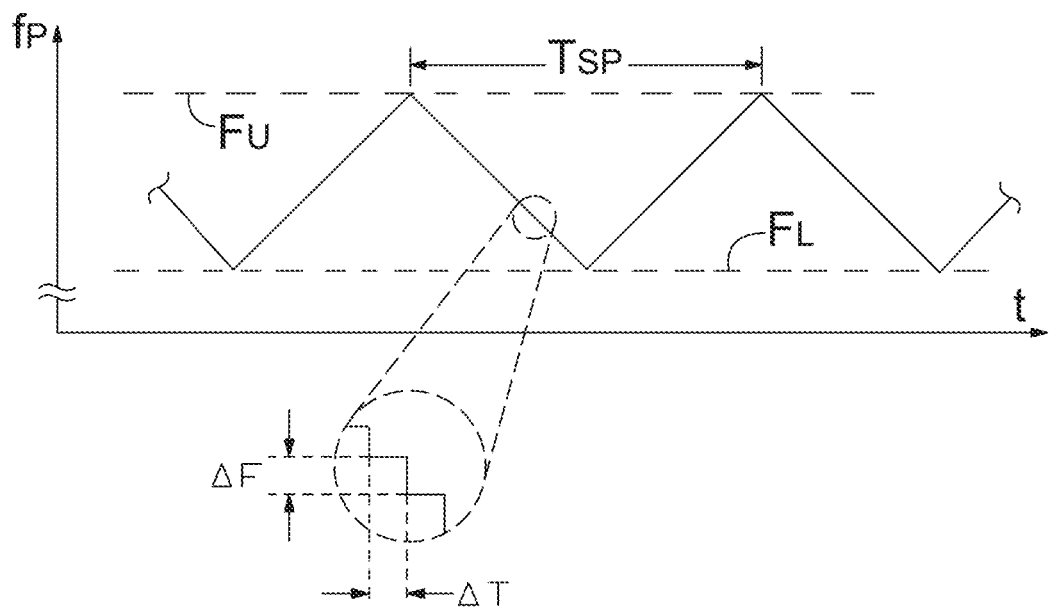
FIGS. 4A-4E are diagrams illustrating representative electrical waveforms of pulsed or AC signals produced by the example control circuit and suitable for powering a light source such as a light emitting diode (LED).

FIGS. 4A-4E are diagrams illustrating representative electrical waveforms representing pulsed or AC signals produced by the example control circuit 60 and suitable for powering a light source 50 such as a light emitting diode (LED) 50. The waveform of FIG. 4A represents the frequency $f_P$ versus time t of the PWM drive signal which varies between a lower frequency $F_L$ and an upper frequency $F_U$ over a time period of $T_{SP}$.

In one example embodiment the lower frequency $F_L$ is about 250 Hz and the upper frequency $F_U$ is about 400 Hz, and the time period $T_{SP}$ is about 2 seconds, increasing in frequency for about 1 second and decreasing in frequency for about 1 second. In another example embodiment the lower frequency $F_L$ is about 252 Hz and the upper frequency $F_U$ is about 320 Hz, and the time period of $T_{SP}$ is about two seconds, increasing in frequency for about one second and decreasing in frequency for about one second.

In one example, where digital incrementing and decrementing of the PWM frequency is employed, in one example embodiment the frequency increment $\Delta F$ is about 3 Hz at a time interval $\Delta T$ of about 20 milliseconds, as shown in the expanded portion of the waveform of FIG. 4A shown in a dashed circle. Where an analog circuit is employed to increase and decrease the PWM drive frequency, e.g., by the charging and discharging of a capacitor, it should not matter whether the capacitor is charged and discharged linearly or non-linearly.

In another example, where digital incrementing and decrementing of the PWM frequency is employed, the frequency increment $\Delta F$ is about 1.36 Hz at a time interval $\Delta T$ of about 20 milliseconds, as shown in the expanded portion of the waveform of FIG. 4A shown in a dashed circle. Where an analog circuit is employed to increase and decrease the PWM drive frequency, e.g., by the charging and discharging of a capacitor, it should not matter whether the capacitor is charged and discharged linearly or non-linearly.

Neither the rate of increase nor the rate of decrease of PWM drive frequency need be uniform or smooth, and neither has to be the same as the other. All that matters is that the frequency of the PWM LED drive signal not be at a substantially constant frequency at which the moving object being illuminated may exhibit a strobing effect that could appear to stop or freeze the motion of the moving object.

Figure 4B:
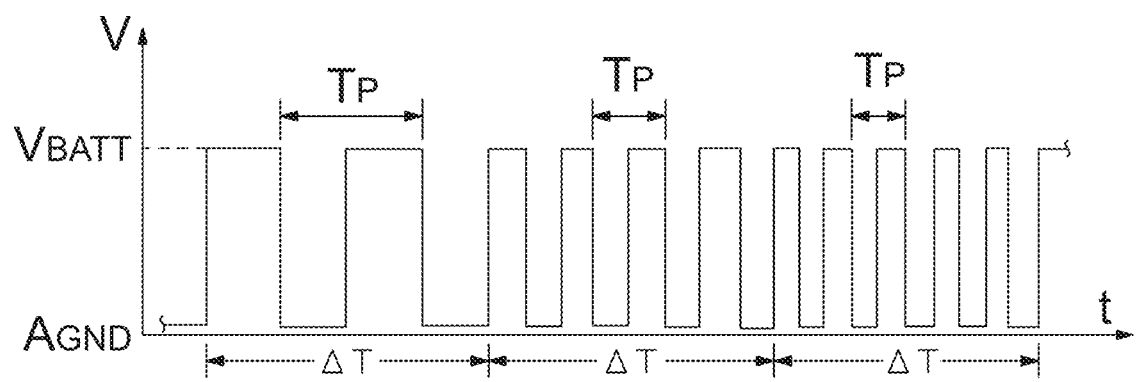

The waveform of FIG. 4B represents a view of the PWM drive signal waveform, e.g., at the output of FET Q1 of FIG. 3 where it connects to LED 50. The waveform of the voltage across the LED 50 is typically a square wave that is inverted from the waveform of the voltage across FET Q1 (e.g., waveform (b)) and is slight lower in voltage than Vbatt due to, e.g., the voltage drops across FET Q1 and resistor R2.

The waveform of FIG. 4B is typically a rectangular wave switching between Vbatt and AGND at the PWM drive frequency. The time in each cycle of that waveform during which the PWM drive signal is at AGND is the time during which FET Q1 is ON and LED 50 receives drive power and produces light; the time during which the PWM drive signal is at Vbatt is the time during which FET Q1 is OFF and LED 50 does not receive drive power and so produces no light.

Because LED 50 is a semiconductor device and responds very rapidly to its drive signal, the light LED 50 produces light proportionally to the amplitude of the drive signal applied thereto. As a result, LED 50 actually turns ON and OFF at the PWM drive frequency, and while that frequency is higher than the human eye can perceive, it can include one or more frequencies in a range that can produce a strobe effect that appears to stop the motion of an object illuminated thereby. Applicant's repetitive sweeping of the PWM drive frequency over a predetermined range of frequencies reduces strobing so that objects do not appear stationary.

In addition, because LED 50 actually turns ON and OFF at the PWM drive frequency it can be operated at an operating point during its ON time whereat its efficiency in converting electrical power into light can be at or near to a higher efficiency or to its highest efficiency, thereby providing a higher average light intensity or brightness than if the average of the applied driving power were to be applied continuously, e.g., by low pass filtering.

For purposes of illustration, the frequency of the PWM LED drive signal of the waveform of FIG. 4B and the rate of incrementing that frequency are altered so as to make the waveform changes due to incrementing the frequency of the PWM drive more apparent in the waveform, whilst the PWM ratio remains constant at, for illustration purposes, 50%. Thus, the illustrated number of cycles of the PWM drive signal in the illustrated increment period ΔT may or may not be within the example ranges of frequencies thereof described.

Therein the ratio of the time at AGND to the total time of the cycle, i.e. time at AGND plus time at Vbatt equals the period $T_P$, is the PWM ratio which indicates the proportion of maximum LED brightness. Control of LED brightness is performed by increasing and decreasing the time at AGND relative to the total period $T_P$.

Figure 4C:
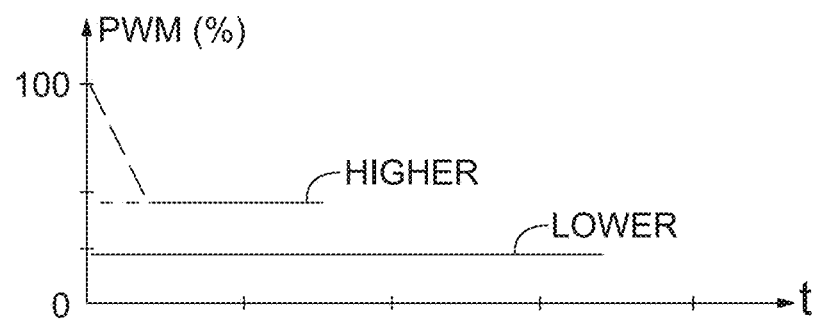

The graph of FIG. 4C represents a graph of example PWM ON time values (in percent) over operating time from turning ON of an example light 10 when operated in the higher brightness operating mode and in the lower brightness operating mode. In the example lower brightness mode, the PWM ON time is substantially fixed, e.g., with LED 50 being operated (ON) at about 25% of each PWM cycle, for the entire operating time, e.g., until the source of electrical power, e.g., battery 40, is substantially discharged.

In the example higher brightness operating mode, two alternative operating modes are illustrated in the graph of FIG. 4C. Over most of the operating time the PWM ON time in higher brightness mode is substantially fixed, e.g., with LED 50 being operated at about 40% of each PWM cycle. In a first example higher brightness operating mode, illustrated by the dashed line with shorter dashes and the solid line, the brightness is substantially fixed, e.g., with LED 50 being operated at about 40% of each PWM cycle, for the entire operating time. In a second example higher brightness operating mode, illustrated by the dashed line with longer dashes and the solid line, the brightness begins at a very high level, e.g., with LED 50 being operated at about 100% of the PWM cycle initially, and then gradually decreasing over a predetermined period of time, e.g., about ¼ to ½ hour, to a substantially fixed value, e.g., with LED 50 being operated at about 40% of each PWM cycle, whereat it remains for the remained of the operating time.

Figure 4D:
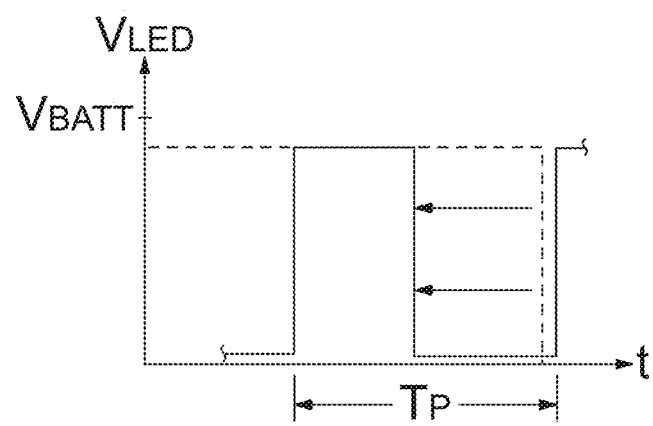
Figure 4E:
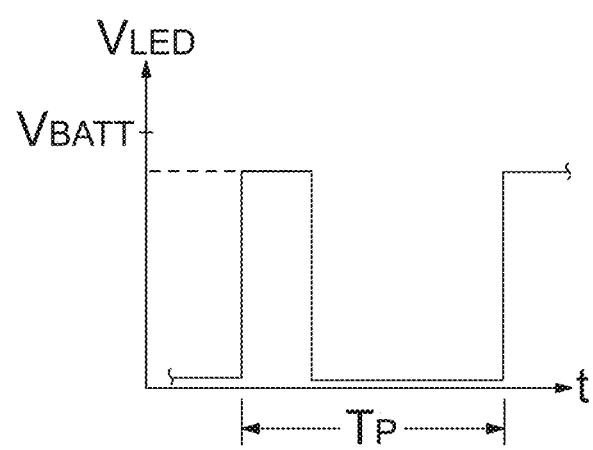

The waveform of FIG. 4D represents one cycle of the PWM drive signal waveform when the control circuit is providing for a relatively high LED brightness and the waveform of FIG. 4E represents one cycle of the PWM drive signal waveform when the control circuit is providing for a relatively low LED brightness; both being illustrated at about the same frequency within the range of frequencies of the PWM drive signal. In one example embodiment wherein the high LED brightness level is about 40% of maximum brightness and the low LED brightness level is about 25% of maximum brightness, the PWM ratio is about 40% for higher brightness and about 25% for lower brightness.

In the higher brightness illustration of FIG. 4D, the waveform shown in solid line represents one cycle of the PWM drive signal when operated at a fixed PWM ON time ratio, e.g., about 40%, and the waveform shown in dashed line with longer dashes represents the case where the brightness is initially at about 95-100% and then gradually decreases (as indicated by the two horizontal arrows pointing from the higher PWM ON ratio, e.g., 95%, to the relatively lower PWM ON ratio of the fixed higher brightness level, e.g., with about 40% PWM ON time ratio.

A control circuit 20, 60 for a light source 50 may comprise: a light source 50 responsive to an electrical drive signal applied thereto over a given predetermined range of frequencies; a drive circuit 60 for applying a pulse width modulated (PWM) drive signal to the light source 50; a pulse width modulator 60, U2 for generating the PWM drive signal, wherein the PWM drive signal has a PWM ON time ratio responsive to a control signal and has a PWM drive frequency that is varied over the given predetermined range of frequencies repeatedly and substantially continuously; wherein the varying frequency of the PWM drive signal causes the light source 50 to produce light at the varying frequency, whereby light at a frequency exhibited by a moving object does not continuously illuminate an object moving at that frequency. The drive circuit 60 may include: a transistor switch having an output coupling the light source 50 to a source of electrical power and having an input coupled to the pulse width modulator 60, U2 to receive the PWM drive signal; or a field effect transistor switch having an output coupling the light source 50 to a source of electrical power and having a gate input coupled to the pulse width modulator 60, U2 to receive the PWM drive signal. The source of electrical power may include: a battery; or a rechargeable battery; or a rechargeable battery and a charging circuit for recharging the rechargeable battery. The control signal to which PWM ON time ratio of the PWM drive signal is responsive may be generated by the opening of an electrical switch, by the closing of the electrical switch, or by the opening and the closing of the electrical switch. The opening and closing of the electrical switch removes and applies, respectively, operating power for the pulse width modulator 60, U2. The control circuit 20, 60 may include a processor and wherein the processor is configured to generate the PWM drive signal and to vary the frequency thereof. The processor increases the frequency of the PWM drive signal by repeatedly incrementing the frequency thereof and decreases the frequency of the PWM drive signal by repeatedly decrementing the frequency thereof, wherein each increment and each decrement continues for a predetermined time period. The increasing the frequency of the PWM drive signal may include a number N of increments thereto and the decreasing the frequency of the PWM drive signal may include a number N of decrements thereto. The number N of increments may be about 50 and the number N of decrements may be about 50, and wherein each increment and each decrement of PWM drive frequency may continue for a predetermined time period of about 20 milliseconds; and wherein each increment and each decrement of PWM drive frequency is about 3 Hertz or is about 1.3 to 1.4 Hertz. Each predetermined time period of increasing PWM drive signal frequency and each predetermined time period of decreasing PWM drive signal frequency may be the same predetermined time period ΔT. The control circuit 20, 60 wherein: the given predetermined range of frequencies of the PWM drive signal is from about 100 Hertz to about 1000 Hertz; or the given predetermined range of frequencies of the PWM drive signal is from about 250 Hertz to about 800 Hertz; or the range of frequencies of the PWM drive signal is from about 250 Hertz to about 400 Hertz; or the range of frequencies of the PWM drive signal is from about 252 Hertz to about 320 Hertz. The frequency of the PWM drive signal may increase for about one second and decrease for about one second. The control circuit 20, 60 may be in combination with a light body containing: the light source 50, the drive circuit 60 for applying a pulse width modulated (PWM) drive signal to the light source 50, and the pulse width modulator 60, U2 for generating the PWM drive signal; or the light source 50, the drive circuit 60 for applying a pulse width modulated (PWM) drive signal to the light source 50, and the pulse width modulator 60, U2 for generating the PWM drive signal, and a source of electrical power therefor; or a light emitting diode (LED) light source 50, the drive circuit 60 for applying a pulse width modulated (PWM) drive signal to the LED, and the pulse width modulator 60, U2 for generating the PWM drive signal; or the light emitting diode (LED) light source 50, the drive circuit 60 for applying a pulse width modulated (PWM) drive signal to the LED, the pulse width modulator 60, U2 for generating the PWM drive signal, and a source of electrical power therefor.

A control circuit 20, 60 for a light source 50 may comprise: a light emitting diode (LED) light source 50; a drive circuit 60 for applying a pulse width modulated (PWM) drive signal to the LED; a processor configured to generate the PWM drive signal and to vary the frequency thereof, the processor may include a pulse width modulator 60, U2 for generating the PWM drive signal, wherein the PWM drive signal has a PWM ON time ratio responsive to a control signal and has a PWM drive frequency that is varied over a range of frequencies repeatedly and substantially continuously; wherein the varying frequency of the PWM drive signal causes the LED to produce light at the varying frequency, whereby light at a frequency exhibited by a moving object does not continuously illuminate an object moving at that frequency. The drive circuit 60 may include: a transistor switch having an output coupling the LED to a source of electrical power and having an input coupled to the pulse width modulator 60, U2 to receive the PWM drive signal; or a field effect transistor switch having an output coupling the LED to a source of electrical power and having a gate input coupled to the pulse width modulator 60, U2 to receive the PWM drive signal. The source of electrical power may include: a battery; or a rechargeable battery; or a rechargeable battery and a charging circuit for recharging the rechargeable battery. The control signal to which PWM ON time ratio of the PWM drive signal is responsive may be generated by the opening of an electrical switch, by the closing of the electrical switch, or by the opening and the closing of the electrical switch. The opening and closing of the electrical switch may remove and apply, respectively, operating power for the pulse width modulator 60, U2. The processor may increase the frequency of the PWM drive signal by repeatedly incrementing the frequency thereof and may decrease the frequency of the PWM drive signal by repeatedly decrementing the frequency thereof, wherein each increment and each decrement continues for a predetermined time period. The increasing the frequency of the PWM drive signal may include a number N of increments thereto and the decreasing the frequency of the PWM drive signal may include a number N of decrements thereto. The number N of increments may be about 50 and the number N of decrements may be about 50, and each increment and each decrement of PWM drive frequency may continue for a predetermined time period of about 20 milliseconds; and each increment and each decrement of PWM drive frequency may be about 3 Hertz or is about 1.3 to 1.4 Hertz. Each predetermined time period of increasing PWM drive signal frequency and each predetermined time period of decreasing PWM drive signal frequency may be the same predetermined time period ΔT. The control circuit 20, 60 wherein: the range of frequencies of the PWM drive signal is from about 100 Hertz to about 1000 Hertz; or the range of frequencies of the PWM drive signal is from about 250 Hertz to about 800 Hertz; or the range of frequencies of the PWM drive signal is from about 250 Hertz to about 400 Hertz; or the range of frequencies of the PWM drive signal is from about 252 Hertz to about 320 Hertz. The frequency of the PWM drive signal may increase for about one second and may decrease for about one second. The control circuit 20, 60 may be in combination with a light body containing: the light emitting diode (LED), the drive circuit 60 for applying a pulse width modulated (PWM) drive signal to the LED, and the processor; or the light emitting diode (LED), the drive circuit 60 for applying a pulse width modulated (PWM) drive signal to the LED, the processor, and a source of electrical power therefor.

A control circuit 20, 60 for a light source 50 may comprise: a light body having a cavity for receiving a source of electrical power; a light emitting diode (LED) light source 50 supported by the light body; a drive circuit 60 supported by the light body for applying a pulse width modulated (PWM) drive signal to the LED; a processor supported by the light body and configured to generate the PWM drive signal and to vary the frequency thereof, the processor may include a pulse width modulator 60, U2 for generating the PWM drive signal, wherein the PWM drive signal has a PWM ON time ratio responsive to a control signal and has a PWM drive frequency that is varied over a predetermined range of frequencies repeatedly and substantially continuously; wherein the varying frequency of the PWM drive signal causes the LED to produce light at the varying frequency; an electrical switch supported by the light body, wherein the control signal to which PWM ON time ratio of the PWM drive signal is responsive is generated by the opening of the electrical switch, by the closing of the electrical switch, or by the opening and the closing of the electrical switch, whereby light at a frequency exhibited by a moving object does not continuously illuminate an object moving at that frequency. The drive circuit 60 may include: a transistor switch having an output coupling the LED to a source of electrical power and having an input coupled to the pulse width modulator 60, U2 to receive the PWM drive signal; or a field effect transistor switch having an output coupling the LED to a source of electrical power and having a gate input coupled to the pulse width modulator 60, U2 to receive the PWM drive signal. The source of electrical power may include: a battery; or a rechargeable battery; or a rechargeable battery and a charging circuit for recharging the rechargeable battery. The opening and closing of the electrical switch may remove and apply, respectively, operating power for the pulse width modulator 60, U2. The processor may increase the frequency of the PWM drive signal by repeatedly incrementing the frequency thereof and may decrease the frequency of the PWM drive signal by repeatedly decrementing the frequency thereof, wherein each increment and each decrement may continue for a predetermined time period. The increasing the frequency of the PWM drive signal may include a number N of increments thereto and the decreasing the frequency of the PWM drive signal may include a number N of decrements thereto. The number N of increments may be about 50 and the number N of decrements may be about 50, and wherein each increment and each decrement of PWM drive frequency may continue for a predetermined time period of about 20 milliseconds; and wherein each increment and each decrement of PWM drive frequency may be about 3 Hertz or may be about 1.3 to 1.4 Hertz. Each predetermined time period of increasing PWM drive signal frequency and each predetermined time period of decreasing PWM drive signal frequency may be the same predetermined time period ΔT. The control circuit 20, 60 wherein: the range of frequencies of the PWM drive signal is from about 100 Hertz to about 1000 Hertz; or the range of frequencies of the PWM drive signal is from about 250 Hertz to about 800 Hertz; or the range of frequencies of the PWM drive signal is from about 250 Hertz to about 400 Hertz; or the range of frequencies of the PWM drive signal is from about 252 Hertz to about 320 Hertz. The frequency of the PWM drive signal may increase for about one second and may decrease for about one second.

A method for a control circuit for a light source responsive to an electrical drive signal applied thereto over a predetermined range of frequencies may comprise: applying a pulse width modulated (PWM) drive signal to the light source; generating the PWM drive signal, wherein the PWM drive signal has a PWM ON time ratio responsive to a control signal and has a PWM drive frequency that is varied over the predetermined range of frequencies repeatedly and substantially continuously; wherein the varying frequency of the PWM drive signal causes the light source to produce light at the varying frequency, whereby light at a frequency exhibited by a moving object does not continuously illuminate an object moving at that frequency. The method for a control circuit may include: coupling the light source to a source of electrical power responsive to the pulse width modulator to receive the PWM drive signal. The method for a control circuit wherein the source of electrical power includes: a battery; or a rechargeable battery; or a rechargeable battery and a charging circuit for recharging the rechargeable battery. The method for a control circuit may include generating the control signal to which PWM ON time ratio of the PWM drive signal is responsive by opening an electrical switch, by closing the electrical switch, or by opening and closing of the electrical switch. The method for a control circuit wherein the opening and closing of the electrical switch includes removing and applying, respectively, operating power for generating the PWM drive signal. The method for a control circuit wherein generating the PWM drive signal and varying the frequency thereof is performed by a processor. The method for a control circuit wherein increasing the frequency of the PWM drive signal includes repeatedly incrementing the frequency thereof and decreasing the frequency of the PWM drive signal includes repeatedly decrementing the frequency thereof, wherein each increment and each decrement continues for a predetermined time period. The method for a control circuit wherein increasing the frequency of the PWM drive signal includes a number N of increments thereto and wherein decreasing the frequency of the PWM drive signal includes a number N of decrements thereto. The method for a control circuit wherein the number N of increments is about 50 and the number N of decrements is about 50, and wherein each increment and each decrement of PWM drive frequency continues for a predetermined time period of about 20 milliseconds; and wherein each increment and each decrement of PWM drive frequency is about 3 Hertz or is about 1.3 to 1.4 Hertz. The method for a control circuit wherein each predetermined time period of increasing PWM drive signal frequency and wherein each predetermined time period of decreasing PWM drive signal frequency are the same predetermined time period ΔT. The method for a control circuit wherein: the predetermined range of frequencies of the PWM drive signal is from about 100 Hertz to about 1000 Hertz; or the predetermined range of frequencies of the PWM drive signal is from about 250 Hertz to about 800 Hertz; or the predetermined range of frequencies of the PWM drive signal is from about 250 Hertz to about 400 Hertz; or the predetermined range of frequencies of the PWM drive signal is from about 252 Hertz to about 320 Hertz. The method for a control circuit wherein the frequency of the PWM drive signal increases for about one second and decreases for about one second.

A method for a control circuit for a light source may include a light emitting diode (LED) light source may comprise: generating a pulse width modulated (PWM) drive signal and to varying the frequency thereof; applying the pulse width modulated (PWM) drive signal to the LED; controlling the PWM drive signal ON time ratio responsive to a control signal; wherein PWM drive signal frequency is varied over a range of frequencies repeatedly and substantially continuously; and wherein the varying frequency of the PWM drive signal causes the LED to produce light at the varying frequency, whereby light at a frequency exhibited by a moving object does not continuously illuminate an object moving at that frequency. The method may include: coupling the LED to a source of electrical power in response to the PWM drive signal. The method wherein the source of electrical power includes: a battery; or a rechargeable battery; or a rechargeable battery and a charging circuit for recharging the rechargeable battery. The method for a control circuit may include generating the control signal to which PWM ON time ratio of the PWM drive signal is responsive by the opening of an electrical switch, by the closing of the electrical switch, or by the opening and the closing of the electrical switch. The method for a control circuit wherein the opening and closing of the electrical switch removes and applies, respectively, operating power for generating the PWM drive signal. The method for a control circuit wherein increasing the frequency of the PWM drive signal includes repeatedly incrementing the frequency thereof and decreasing the frequency of the PWM drive signal includes repeatedly decrementing the frequency thereof, wherein each increment and each decrement continues for a predetermined time period. The method for a control circuit wherein increasing the frequency of the PWM drive signal includes a number N of increments thereto and wherein decreasing the frequency of the PWM drive signal includes a number N of decrements thereto. The method for a control circuit wherein the number N of increments is about 50 and the number N of decrements is about 50, and wherein each increment and each decrement of PWM drive frequency continues for a predetermined time period of about 20 milliseconds; and wherein each increment and each decrement of PWM drive frequency is about 3 Hertz or is about 1.3 to 1.4 Hertz. The method for a control circuit wherein each predetermined time period of increasing PWM drive signal frequency and wherein each predetermined time period of decreasing PWM drive signal frequency are the same predetermined time period ΔT. The method for a control circuit wherein: the range of frequencies of the PWM drive signal is from about 100 Hertz to about 1000 Hertz; or the range of frequencies of the PWM drive signal is from about 250 Hertz to about 800 Hertz; or the range of frequencies of the PWM drive signal is from about 250 Hertz to about 400 Hertz; or the range of frequencies of the PWM drive signal is from about 252 Hertz to about 320 Hertz. The method for a control circuit wherein the frequency of the PWM drive signal increases for about one second and decreases for about one second.

As used herein, the term "about" means that dimensions, sizes, formulations, parameters, shapes and other quantities and characteristics are not and need not be exact, but may be approximate and/or larger or smaller, as desired, reflecting tolerances, conversion factors, rounding off, measurement error and the like, and other factors known to those of skill in the art. In general, a dimension, size, formulation, parameter, shape or other quantity or characteristic is "about" or "approximate" whether or not expressly stated to be such. It is noted that embodiments of very different sizes, shapes and dimensions may employ the described arrangements.

Although terms such as "front," "back," "rear," "side," "end," "top," "bottom," "up," "down," "left," "right," "upward," "downward," "forward," "backward," "under" and/or "over," "vertical," "horizontal," and the like may be used herein as a convenience in describing one or more embodiments and/or uses of the present arrangement, the articles described may be positioned in any desired orientation and/or may be utilized in any desired position and/or orientation. Such terms of position and/or orientation should be understood as being for convenience only, and not as limiting of the invention as claimed.

As used herein, the term "and/or" encompasses both the conjunctive and the disjunctive cases, so that a phrase in the form "A and/or B" encompasses "A" or "B" or "A and B" and a phrase in the form "A, B and/or C" includes "A," "B," "C," "A and B," "A and C," "B and C," and "A and B and C." In addition, the term "at least one of" one or more elements is intended to include one of any one of the elements, more than one of any of the elements, and two or more of the elements up to and including all of the elements, and so, e.g., phrases in the form "at least one of A, B and C" include "A," "B," "C," "A and B," "A and C," "B and C," and "A and B and C."

As used herein, the term "predetermined" means determined in advance and while that may include a fixed value, position, condition and/or limit, predetermined is not limited to a fixed value, position, condition and/or limit. A predetermined value, position, condition and/or limit may change or otherwise vary over time, over a sequence and/or over a randomized series of values, positions, conditions and/or limits.

A fastener as used herein may include any fastener or other fastening device that may be suitable for the described use, including threaded fasteners, e.g., bolts, screws and driven fasteners, as well as pins, rivets, nails, spikes, barbed fasteners, clips, clamps, nuts, speed nuts, cap nuts, acorn nuts, and the like. Where it is apparent that a fastener would be removable in the usual use of the example embodiment described herein, then removable fasteners would be preferred in such instances. A fastener may also include, where appropriate, other forms of fastening such as a formed head, e.g., a peened or heat formed head, a weld, e.g., a heat weld or ultrasonic weld, a braze, and adhesive, and the like.

While various operations, steps and/or elements of a process or method or operation may be described in an order or sequence, the operations, steps and/or elements do not need to be performed in that order or sequence, or in any particular order or sequence, unless expressly stated to require a particular order or sequence.

As used herein, the terms "connected" and "coupled" as well as variations thereof may or may not be intended to be exact synonyms, but may also encompass some similar things and some different things. The term "connected" as indicated by its context may be used generally to refer to elements that have a direct electrical and/or physical contact to each other, whereas the term "coupled" as indicated by its context may be used generally to refer to elements that have an indirect electrical and/or physical contact with each other, e.g., via one or more intermediate elements, so as to cooperate and/or interact with each other, and may include elements in direct contact as well.

The term battery is used herein to refer to an electro-chemical device comprising one or more electro-chemical cells and/or fuel cells, and so a battery may include a single cell or plural cells, whether as individual units or as a packaged unit. A battery is one example of a type of an electrical power source suitable for a portable or other device. Such devices could include power sources including, but not limited to, fuel cells, super capacitors, solar cells, and the like. Any of the foregoing may be intended for a single use or for being rechargeable or for both, and/or plural ones thereof may be combined into a battery pack or battery assembly.

Various embodiments of a battery may have one or more battery cells, e.g., one, two, or more battery cells, as may be deemed suitable for any particular device. A battery may employ various types and kinds of battery chemistry types, e.g., a carbon-zinc, alkaline, lead acid, nickel-cadmium (Ni—Cd), nickel-metal-hydride (NiMH) or lithium-ion (Li-Ion) battery type, of a suitable number of cells and cell capacity for providing a desired operating time and/or lifetime for a particular device, and may be intended for a single use or for being rechargeable or for both. Examples may include a two or three cell lead acid battery typically producing about 4 volts or about 6 volts, a three cell Ni—Cd or NiMH battery typically producing about 3.6 volts, a four cell NiCd or NiMH battery typically producing about 4.8 volts, a Li-Ion battery typically producing about 3.5 volts, or a two-cell Li-Ion battery typically producing about 7 volts, it being noted that the voltages produced thereby will be higher when approaching full charge and will be lower in discharge, particularly when providing higher current and when reaching a low level of charge, e.g., becoming discharged.

The term DC converter is used herein to refer to any electronic circuit that receives at an input electrical power at one voltage and current level and provides at an output DC electrical power at a different voltage and/or current level. Examples may include a DC-DC converter, an AC-DC converter, a boost converter, a buck converter, a buck-boost converter, a single-ended primary-inductor converter (SEPIC), a series regulating element, a current level regulator, and the like. The input and output thereof may be DC coupled and/or AC coupled, e.g., as by a transformer and/or capacitor. A DC converter may or may not include circuitry for regulating a voltage and/or a current level, e.g., at an output thereof, and may have one or more outputs providing electrical power at different voltage and/or current levels and/or in different forms, e.g., AC or DC.

While the present invention has been described in terms of the foregoing example embodiments, variations within the scope and spirit of the present invention as defined by the claims following will be apparent to those skilled in the art. For example, example LED drive circuit 60 provides a variable frequency PWM voltage drive signal for energizing LED 50 and employs a series resistor R2 for setting the level of current flowing through LED 50 responsive to Vbatt and FET Q1. Alternatively, FET Q1 may be operated in a current regulating mode so as to control the level of current flowing in LED 50 to a predetermined current level even as the supply voltage thereto, e.g., Vbatt, may change.

While the illustrated example embodiment provides alternating periods of incrementing and decrementing the frequency of the PWM drive signal, e.g., in a "saw-tooth" fashion, one or the other could be very much shorted that the other, even to the point of being substantially vanishing, in which case the frequency of the PWM drive signal would include repeating substantial periods of increasing frequency separated by very rapid return to the starting frequency. The increasing and decreasing of PWM drive frequency can include other, e.g., alternative, forms such as sinusoidal or wavy forms.

While the illustrated example embodiment provides two levels of LED brightness and provides momentary ON/OFF and continuous ON/OFF functions, additional modes and functions may be provided. For example, additional brightness levels, dimming and undimming modes, a flashing mode and the like may be provided. Were a 100% brightness mode be provided and utilized, the PWM drive signal would be continuously driving the LED 50 which would be continuously ON. In that condition, it is immaterial whether the part of control circuit 60 that varies the PWM frequency ceases to operate or continues to operate because it will have no effect on the driving of LED 50 and with essentially continuous drive, there is no strobe effect to cause misperception of the motion of an illuminated object.

Further, any circuit and method that causes the PWM drive frequency to vary essentially continuously according to any form of varying frequency is thought to be suitable in the context of the present arrangement. For example, the PWM drive frequency could increase from a lower frequency to an upper frequency over a period of time and then return to a lower frequency, irrespective of whether the upper and/or lower frequencies of different cycles are the same as or different from that of any other cycle, and/or irrespective of whether the time periods of increasing PWM drive frequency and decreasing drive frequency are the same or different, including where one time period is substantially different from any other. Thus the waveform of PWM drive frequency versus time could be a triangular wave or a sawtooth wave, and/or of a regular or irregular period, and/or may have a straight or curved shape, e.g., an exponential rise and/or fall or a sinusoidal or other shape.

Further a DC converter may be provided, e.g., between battery 40 and LED control circuit 60, for providing a desired predetermined voltage for driving the LED 50, or in conjunction with controlled operation of FET Q1 for providing a variable LED voltage that varies for causing a predetermined level of current to flow through LED 50.

Alternatively, the power supply voltage, Vbatt, may be coupled to control IC U2 for enabling IC U2 to vary the PWM ratio of PWM drive signal to vary the effective drive voltage or current to LED 50, e.g., for reducing the effect of changes in battery voltage Vbatt on the brightness of the light produced by LED 50. Such brightness control need not affect the frequency of the PWM drive signal or of the increasing and decreasing thereof.

Each of the U.S. Provisional Applications, U.S. Patent Applications, and/or U.S. Patents, identified herein is hereby incorporated herein by reference in its entirety, for any purpose and for all purposes irrespective of how it may be referred to or described herein.

Finally, numerical values stated are typical or example values, are not limiting values, and do not preclude substantially larger and/or substantially smaller values. Values in any given embodiment may be substantially larger and/or may be substantially smaller than the example or typical values stated.

What is claimed is:

1. A control circuit for a light source comprising:
a light source responsive to an electrical drive signal applied thereto over a predetermined range of frequencies;
a drive circuit for applying a pulse width modulated (PWM) drive signal to the light source;
a pulse width modulator for generating the PWM drive signal, wherein the PWM drive signal has a PWM ON time ratio responsive to a control signal and has a PWM drive frequency that is varied over the predetermined range of frequencies repeatedly and substantially continuously;
wherein the varying frequency of the PWM drive signal causes the light source to produce light at the varying frequency,
whereby light at a frequency exhibited by a moving object does not continuously illuminate an object moving at that frequency.

2. The control circuit of claim 1 wherein the drive circuit includes:
a transistor switch having an output coupling the light source to a source of electrical power and having an input coupled to the pulse width modulator to receive the PWM drive signal; or
a field effect transistor switch having an output coupling the light source to a source of electrical power and having a gate input coupled to the pulse width modulator to receive the PWM drive signal.

3. The control circuit of claim 2 wherein the source of electrical power includes:
a battery; or
a rechargeable battery; or
a rechargeable battery and a charging circuit for recharging the rechargeable battery.

4. The control circuit of claim 1 wherein the control signal to which PWM ON time ratio of the PWM drive signal is responsive is generated by the opening of an electrical switch, by the closing of the electrical switch, or by the opening and the closing of the electrical switch.

5. The control circuit of claim 4 wherein the opening and closing of the electrical switch removes and applies, respectively, operating power for the pulse width modulator.

6. The control circuit of claim 1 wherein the control circuit includes a processor and wherein the processor is configured to generate the PWM drive signal and to vary the frequency thereof.

7. The control circuit of claim 6 wherein the processor increases the frequency of the PWM drive signal by repeatedly incrementing the frequency thereof and decreases the frequency of the PWM drive signal by repeatedly decrementing the frequency thereof, wherein each increment and each decrement continues for a predetermined time period.

8. The control circuit of claim 7 wherein increasing the frequency of the PWM drive signal includes a number N of increments thereto and wherein decreasing the frequency of the PWM drive signal includes a number N of decrements thereto.

9. The control circuit of claim 8 wherein the number N of increments is about 50 and the number N of decrements is about 50, and wherein each increment and each decrement of PWM drive frequency continues for a predetermined time period of about 20 milliseconds; and wherein each increment and each decrement of PWM drive frequency is about 3 Hertz or is about 1.3 to 1.4 Hertz.

10. The control circuit of claim 7 wherein each predetermined time period of increasing PWM drive signal frequency and wherein each predetermined time period of decreasing PWM drive signal frequency are the same predetermined time period ΔT.

11. The control circuit of claim 1 wherein:
the predetermined range of frequencies of the PWM drive signal is from about 100 Hertz to about 1000 Hertz; or the predetermined range of frequencies of the PWM drive
signal is from about 250 Hertz to about 800 Hertz; or
the predetermined range of frequencies of the PWM drive
signal is from about 250 Hertz to about 400 Hertz; or
the predetermined range of frequencies of the PWM drive
signal is from about 252 Hertz to about 320 Hertz.

12. The control circuit of claim 1 wherein the frequency of the PWM drive signal increases for about one second and decreases for about one second.

13. The control circuit of claim 1 in combination with a light body containing:
   the light source, the drive circuit for applying a pulse width modulated (PWM) drive signal to the light source, and the pulse width modulator for generating the PWM drive signal; or
   the light source, the drive circuit for applying a pulse width modulated (PWM) drive signal to the light source, and the pulse width modulator for generating the PWM drive signal, and a source of electrical power therefor; or
   a light emitting diode (LED) light source, the drive circuit for applying a pulse width modulated (PWM) drive signal to the LED, and the pulse width modulator for generating the PWM drive signal; or
   the light emitting diode (LED) light source, the drive circuit for applying a pulse width modulated (PWM) drive signal to the LED, the pulse width modulator for generating the PWM drive signal, and a source of electrical power therefor.

14. A control circuit for a light source comprising:
   a light emitting diode (LED) light source;
   a drive circuit for applying a pulse width modulated (PWM) drive signal to the LED;
   a processor configured to generate the PWM drive signal and to vary the frequency thereof,
   the processor including a pulse width modulator for generating the PWM drive signal, wherein the PWM drive signal has a PWM ON time ratio responsive to a control signal and has a PWM drive frequency that is varied over a range of frequencies repeatedly and substantially continuously;
   wherein the varying frequency of the PWM drive signal causes the LED to produce light at the varying frequency,
   whereby light at a frequency exhibited by a moving object does not continuously illuminate an object moving at that frequency.

15. The control circuit of claim 14 wherein the drive circuit includes:
   a transistor switch having an output coupling the LED to a source of electrical power and having an input coupled to the pulse width modulator to receive the PWM drive signal; or
   a field effect transistor switch having an output coupling the LED to a source of electrical power and having a gate input coupled to the pulse width modulator to receive the PWM drive signal.

16. The control circuit of claim 15 wherein the source of electrical power includes:
   a battery; or
   a rechargeable battery; or
   a rechargeable battery and a charging circuit for recharging the rechargeable battery.

17. The control circuit of claim 14 wherein the control signal to which PWM ON time ratio of the PWM drive signal is responsive is generated by the opening of an electrical switch, by the closing of the electrical switch, or by the opening and the closing of the electrical switch.

18. The control circuit of claim 17 wherein the opening and closing of the electrical switch removes and applies, respectively, operating power for the pulse width modulator.

19. The control circuit of claim 14 wherein the processor increases the frequency of the PWM drive signal by repeatedly incrementing the frequency thereof and decreases the frequency of the PWM drive signal by repeatedly decrementing the frequency thereof, wherein each increment and each decrement continues for a predetermined time period.

20. The control circuit of claim 19 wherein increasing the frequency of the PWM drive signal includes a number N of increments thereto and wherein decreasing the frequency of the PWM drive signal includes a number N of decrements thereto.

21. The control circuit of claim 20 wherein the number N of increments is about 50 and the number N of decrements is about 50, and wherein each increment and each decrement of PWM drive frequency continues for a predetermined time period of about 20 milliseconds; and wherein each increment and each decrement of PWM drive frequency is about 3 Hertz or is about 1.3 to 1.4 Hertz.

22. The control circuit of claim 19 wherein each predetermined time period of increasing PWM drive signal frequency and wherein each predetermined time period of decreasing PWM drive signal frequency are the same predetermined time period $\Delta T$.

23. The control circuit of claim 14 wherein:
   the range of frequencies of the PWM drive signal is from about 100 Hertz to about 1000 Hertz; or
   the range of frequencies of the PWM drive signal is from about 250 Hertz to about 800 Hertz; or
   the range of frequencies of the PWM drive signal is from about 250 Hertz to about 400 Hertz; or
   the range of frequencies of the PWM drive signal is from about 252 Hertz to about 320 Hertz.

24. The control circuit of claim 14 wherein the frequency of the PWM drive signal increases for about one second and decreases for about one second.

25. The control circuit of claim 14 in combination with a light body containing:
   the light emitting diode (LED), the drive circuit for applying a pulse width modulated (PWM) drive signal to the LED, and the processor; or
   the light emitting diode (LED), the drive circuit for applying a pulse width modulated (PWM) drive signal to the LED, the processor, and a source of electrical power therefor.

26. A control circuit for a light source comprising:
   a light body having a cavity for receiving a source of electrical power;
   a light emitting diode (LED) light source supported by the light body;
   a drive circuit supported by the light body for applying a pulse width modulated (PWM) drive signal to the LED;
   a processor supported by the light body and configured to generate the PWM drive signal and to vary the frequency thereof,
   the processor including a pulse width modulator for generating the PWM drive signal, wherein the PWM drive signal has a PWM ON time ratio responsive to a control signal and has a PWM drive frequency that is varied over a predetermined range of frequencies repeatedly and substantially continuously;

wherein the varying frequency of the PWM drive signal causes the LED to produce light at the varying frequency;

an electrical switch supported by the light body, wherein the control signal to which PWM ON time ratio of the PWM drive signal is responsive is generated by the opening of the electrical switch, by the closing of the electrical switch, or by the opening and the closing of the electrical switch, whereby light at a frequency exhibited by a moving object does not continuously illuminate an object moving at that frequency.

27. The control circuit of claim 26 wherein the drive circuit includes:
a transistor switch having an output coupling the LED to a source of electrical power and having an input coupled to the pulse width modulator to receive the PWM drive signal; or
a field effect transistor switch having an output coupling the LED to a source of electrical power and having a gate input coupled to the pulse width modulator to receive the PWM drive signal.

28. The control circuit of claim 26 wherein the source of electrical power includes:
a battery; or
a rechargeable battery; or
a rechargeable battery and a charging circuit for recharging the rechargeable battery.

29. The control circuit of claim 26 wherein the opening and closing of the electrical switch removes and applies, respectively, operating power for the pulse width modulator.

30. The control circuit of claim 26 wherein the processor increases the frequency of the PWM drive signal by repeatedly incrementing the frequency thereof and decreases the frequency of the PWM drive signal by repeatedly decrementing the frequency thereof, wherein each increment and each decrement continues for a predetermined time period.

31. The control circuit of claim 30 wherein increasing the frequency of the PWM drive signal includes a number N of increments thereto and wherein decreasing the frequency of the PWM drive signal includes a number N of decrements thereto.

32. The control circuit of claim 31 wherein the number N of increments is about 50 and the number N of decrements is about 50, and wherein each increment and each decrement of PWM drive frequency continues for a predetermined time period of about 20 milliseconds; and wherein each increment and each decrement of PWM drive frequency is about 3 Hertz or is about 1.3 to 1.4 Hertz.

33. The control circuit of claim 30 wherein each predetermined time period of increasing PWM drive signal frequency and wherein each predetermined time period of decreasing PWM drive signal frequency are the same predetermined time period $\Delta T$.

34. The control circuit of claim 26 wherein:
the range of frequencies of the PWM drive signal is from about 100 Hertz to about 1000 Hertz; or
the range of frequencies of the PWM drive signal is from about 250 Hertz to about 800 Hertz; or
the range of frequencies of the PWM drive signal is from about 250 Hertz to about 400 Hertz; or
the range of frequencies of the PWM drive signal is from about 252 Hertz to about 320 Hertz.

35. The control circuit of claim 26 wherein the frequency of the PWM drive signal increases for about one second and decreases for about one second.

\* \* \* \* \*